United States Patent Office

2,845,436
Patented July 29, 1958

2,845,436

AMINO-2,3-DIPHENYLINDOLES

Louis E. Craig, Pryor, Okla., assignor to General Aniline & Film Corporation, New York, N. Y., a corporation of Delaware No Drawing. Application June 21, 1956
Serial No. 592,720

2 Claims. (Cl. 260—319)

This invention relates to the preparation of new amino-diphenylindoles, and relates more particularly to the preparation of new amino-2,3-diphenylindoles by a condensation reaction involving a phenylenediamine and an unsubstituted or substituted benzoin.

I have found that diphenylindoles suitable for use as whitening or brightening agents for white and dyed textile products, such as fibers, filaments and fabrics, having a basis of synthetic materials, for example nylon, cellulose esters, polyesters of terephthalic acid and ethylene glycol, polymers of acrylonitrile, copolymers of acrylonitrile and vinyl chloride and the like, as well as for films and plastic bodies of said synthetic material. This I have described and claimed in my copending application of S. No. 592,721, filed on even date herewith (now abandoned).

It is an object of this invention to prepare in a simple and expeditious manner new amino-diphenylindoles which exhibit exceptional fluorescence under ultraviolet light and which are highly satisfactory brightening agents for white and dyed materials.

Other objects of this invention will appear from the following detailed description and claims.

In accordance with this invention, there are prepared new compounds having the following formula

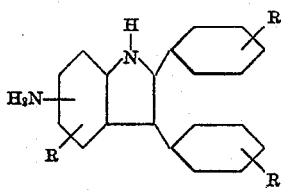

where R may be alkyl, aryl, arylalkyl, halogen, acylamido, hydroxy, alkoxy, amino, alkylamino, and the like, and where the R's may be the same or different.

The above compounds may be prepared in accordance with the instant invention by reacting a phenylenediamine with an unsubstituted or substituted benzoin. More specifically, a solution of equivalent amounts of m- or p-phenylenediamine, or a substituted m- or p-phenylenediamine, and the benzoin is heated with stirring at reflux temperature, preferably in an inert atmosphere, e. g. nitrogen or carbon dioxide, and in the presence of a catalyst, the water formed in the reaction removed, and the residue permitted to cool whereby crystals of the amino-2,3-diphenylindole are formed.

This invention will be specifically illustrated, but not limited by the following examples, the parts being by weight.

Example I

A solution of 22 parts of m-phenylenediamine, 42 parts of benzoin, and 5 parts of p-toluene sulfonic acid monohydrate in 85 parts of xylene was, after flushing out the system with nitrogen, heated at reflux with stirring. Water split out in the reaction was removed continuously by means of a moisture trap, and the reaction was followed by the amount of water collected. The theoretical amount of water (7.7 parts) was collected in 2¼ hours. At this point, the reaction mixture (a solid had separated) was cooled and about 90 parts of benzene added, the solid was collected by filtration to give 46 parts of a mixture of the desired 6-amino-2,3-diphenylindole (A) and the product of the reaction of two moles of benzoin with one of m-phenylenediamine, 2,3,5,6-tetraphenyl-1,7-dihydrobenzo[1,2-b,5,4-b']dipyrrole (B).

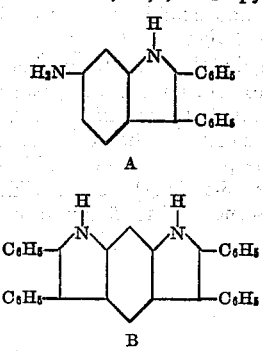

The 6-amino-2,3-diphenylindole was isolated by slurrying the product in 400 parts of 50% aqueous acetic acid, filtering off the insoluble material (B), and making the filtrate alkaline. The 6-amino-2,3-diphenylindole precipitated as a light grey solid, melting point 172–175° C. The yield was 27 parts (48% of theory); the product was characterized by conversion to 6-acetamido-2,3-diphenylindole by treatment with acetic anhydride. The product, obtained as colorless needles from ethanol, melted at 282 to 283° C. and was identical with 6-acetamido-2,3-diphenylindole described in my copending application S. No. 592,747, filed on even date herewith.

Example II

The procedure of Example I was repeated except that 150 parts of petroleum ether was added to the reaction mixture rather than 90 parts of benzene. Isolation of the 6-amino-2,3-diphenylindole in the same manner as above gave a product, melting point 171–174° C., in about 75% yield.

Example III

The procedure of Example I was followed except that carefully purified p-phenylenediamine was used in place of the m-phenylenediamine. The product obtained in crude yield of about 50% was a grey solid which was characterized as the n-acetyl derivative, melting point 242–243° C. This was identical with 5-acetamido-2,3-diphenylindole described in the said application S. No. 592,747.

The condensation as described in Examples I, II and III may be carried out with substituted benzoins, such as 4-methoxy-, 2,4-methylenedioxy-, 4-dimethylamino-, 2-hydroxy-, 2'-hydroxy-, 4'-methoxy-, 2,2'-dimethoxy-, 4,4'-dimethoxy-, 4,4'-diacetamido-, 4-phenyl-, 4,4'-diphenyl, 4-chloro-, 4-chloro-4'-methoxy-, 3,3'-dichloro-benzoin, and the like. Examples of m- and p-phenylenediamine derivatives which may be employed in accordance with my invention are 4-chloro-, 4,6-dichloro-, 4-methoxy-, 5-methoxy-, and 4-ethoxy-m-phenylenediamine, and 2-chloro-2,6-dichloro-, 2,6-dimethyl-, 2,3-dimethyl, 2,5-dimethyl-, 2-methoxy-, and 2-phenyl-p-phenylene-diamine.

Other solvents which may be used are chlorobenzene, dichlorobenzene, dimethylaniline, nitrobenzene, ethylbenzene, and the like. Any non-solvent can be used to throw the product completely out of solution, others which might be useful are carbon tetrachloride, methanol, hexane, cyclohexane, and the like. Separation of the amino compound from the very insoluble 2,3,5,6- tetraphenyl-1,7-dihydrobenzo[1,2-b,5,4-b']dipyrrole can also be effected with dilute mineral acids, such as hydrochloric, sulfuric, phosphoric, and the like.

The subject compounds can also be prepared by other methods. For example, the 5- and 6-acetamido-2,3-diphenylindoles can be hydroylzed, although rather drastic hydroylsis conditions are required and considerable darkening and decomposition occurs. The 5- and 6-chloro-2,3-diphenylindoles which can be obtained in low yield from benzoin and m- and p-chloraniline, may be converted to the amino compounds by treatment with ammonia at high temperature and pressure.

5-amino-2,3-diphenylindole produced in accordance with this invention exhibits an intense blue fluorescence under ultraviolet light, particularly in solution. Diluting the diphenylindole with an oil diluent, such as lubricating oil, motor oil, mineral oil, gasoline and crude oil, and also with dimethylformamide ether, alcohols, ketones and the like, to a concentration of 0.000156 g./liter, which is less than one part per million, still show visible fluorescence. The 6-amino-2,3-diphenylindole exhibits a similar fluorescence. The 5-amino compound is substantive to nylon and acetate rayon and imparts brightening by fluorescence. This compound is given considerable more light stability by alkylating the amino group and still has a comparable fluorescence.

It is to be understood that the foregoing detailed description is given merely by way of illustration and that many variations may be made therein without departing from the spirit of my invention.

Having described my invention what I desire to secure by Letters Patent is:
1. 6-amino-2,3-diphenylindole.
2. 5-amino-2,3-diphenylindole.

References Cited in the file of this patent
UNITED STATES PATENTS

| | | |
|---|---|---|
| 2,057,948 | Herdieckerhoff et al. | Oct. 20, 1936 |
| 2,460,745 | Grimmel et al. | Feb. 1, 1949 |
| 2,510,428 | Standen | June 6, 1950 |

FOREIGN PATENTS

| | | |
|---|---|---|
| 533,471 | Germany | Sept. 12, 1931 |